(12) United States Patent
Ashimine et al.

(10) Patent No.: US 12,449,568 B2
(45) Date of Patent: Oct. 21, 2025

(54) METHOD FOR MANUFACTURING OPTICAL ELEMENT, OPTICAL ELEMENT, AERIAL IMAGE DISPLAY DEVICE, AND SPATIAL INPUT DEVICE

(71) Applicant: Alps Alpine Co., Ltd., Tokyo (JP)

(72) Inventors: Katsunari Ashimine, Fukushima (JP); Shingo Yuza, Fukushima (JP); Chihiro Oshima, Fukushima (JP); Hirokuni Fukai, Osaki (JP); Kazuya Hikichi, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 435 days.

(21) Appl. No.: 18/165,427

(22) Filed: Feb. 7, 2023

(65) Prior Publication Data

US 2023/0288613 A1  Sep. 14, 2023

(30) Foreign Application Priority Data

Mar. 9, 2022  (JP) .................. 2022-035870

(51) Int. Cl.
*G02B 3/00* (2006.01)
*B29D 11/00* (2006.01)
*C03B 11/00* (2006.01)
*G02B 30/56* (2020.01)

(52) U.S. Cl.
CPC ...... *G02B 3/0031* (2013.01); *B29D 11/00365* (2013.01); *C03B 11/00* (2013.01); *G02B 3/0037* (2013.01); *G02B 30/56* (2020.01); *C03B 2215/46* (2013.01)

(58) Field of Classification Search
None
See application file for complete search history.

(56) References Cited

U.S. PATENT DOCUMENTS

| 8,540,371 B2 * | 9/2013 | Sugiyama .............. G02B 30/56 359/454 |
| 8,878,780 B2 * | 11/2014 | Chan .................. G02B 27/0093 359/462 |
| 11,340,475 B2 | 5/2022 | Yamamoto et al. |

(Continued)

FOREIGN PATENT DOCUMENTS

| CN | 108181712 A | 6/2018 |
| JP | 2017-107165 A | 6/2017 |

(Continued)

OTHER PUBLICATIONS

Extended European Search Report in European Patent Application 23159354.2 dated Aug. 1, 2023, 12 pages.

(Continued)

*Primary Examiner* — Robert E. Tallman
(74) *Attorney, Agent, or Firm* — Crowell & Moring LLP

(57) ABSTRACT

A method for manufacturing an optical element includes forming an optical element unit comprised of an optical material such as glass and having an outer shape of a regular triangle or a regular hexagon, arranging a plurality of optical element units two-dimensionally on a substrate so as to have a structure imitating a molecular structure of graphene or a carbon nanotube, and processing the substrate on which the plurality of optical element units are mounted into a desired surface shape.

10 Claims, 5 Drawing Sheets

(56) References Cited

U.S. PATENT DOCUMENTS

| | | | | |
|---|---|---|---|---|
| 2003/0124849 A1* | 7/2003 | Ihara | ................ | G02B 6/0065 |
| | | | | 438/689 |
| 2004/0004765 A1* | 1/2004 | Ihara | ................ | G02B 5/124 |
| | | | | 359/530 |
| 2010/0128271 A1* | 5/2010 | Maekawa | ............ | G02B 30/00 |
| | | | | 356/435 |
| 2012/0019941 A1 | 1/2012 | Dubowsky et al. | | |

FOREIGN PATENT DOCUMENTS

| | | |
|---|---|---|
| JP | 2019-066833 A | 4/2019 |
| KR | 20050000758 A | 1/2005 |
| WO | WO 2021/260989 A1 | 12/2021 |
| WO | WO 2022/018971 A1 | 1/2022 |

OTHER PUBLICATIONS

Suginohara et al., "An Aerial Display: Passing through a Floating Image Formed by Retro-Reflective Reimaging," *SID Digest, Book 1: Session 29: Aerial Displays*, 48(1): 406-409 (2017).

Sun et al., "Fabrication of microlens arrays with varied focal lengths on curved surfaces using an electrostatic deformed template," *J. Micromech. Microeng.*, 24, 065008, pp. 1-6 (2014).

\* cited by examiner

MOLECULAR MODEL OF GRAPHENE

METHOD FOR MANUFACTURING OPTICAL ELEMENT, OPTICAL ELEMENT, AERIAL IMAGE DISPLAY DEVICE, AND SPATIAL INPUT DEVICE

BACKGROUND

Related Application

The present application claims priority to Japanese Patent Application Number 2022-035870, filed Mar. 9, 2022, the entirety of which is hereby incorporated by reference.

Field

The present disclosure relates to a method for manufacturing an optical element, and more particularly relates to a method for manufacturing a retroreflective member or the like used in an aerial image display device.

DESCRIPTION OF THE RELATED ART

An aerial display that forms an image in the air and displayed on a display using a retroreflective member or the like has been proposed. For example, in order to enable observation of an image formed in the air from a wider angle, the display device of JP 2017-107165 A uses two retroreflective members, and one of the retroreflective members is disposed on an emission axis of a light source. In order to inhibit a reduction in the viewability of an image, an image display device in JP 2019-66833 A reduces the number of times of transmission of light through a retardation member ($\lambda/4$ plate), and additionally prevents dust or the like from entering between a retroreflective member and the retardation member.

SUMMARY

As a configuration for obtaining stereoscopic effect in display, there is an aerial image element that enables stereoscopic vision by imparting a lens structure or a prism structure. FIG. 1 illustrates a schematic cross section of a display device using a retroreflective member. As illustrated in the drawing, the display device 10 includes a display 20 that outputs an image, a beam splitter 30, and a retroreflective member 40. Light L1 emitted from the display 20 is reflected by the beam splitter 30, and reflected light L2 travels to the retroreflective member 40. The retroreflective member 40 reflects light L3 in the same direction as incident light, and the reflected light L3 passes through the beam splitter 30, and an aerial image 50 is displayed in a space in front of the observer's eyes.

The aerial image 50 that can be observed by the observer is limited to a range in which the observer can see the retroreflective member 40. That is, the retroreflective member 40 needs to be present within the viewing angle of the observer. Further, the aerial image 50 is formed at a position symmetrical to the display 20 with respect to the surface of the beam splitter 30. In a case where the display 20 is inclined at 45 degrees with respect to the beam splitter 30, the aerial image 50 observed by the observer is an image viewed from an oblique direction of 45 degrees.

Such a conventional display device has the following problems. Since retroreflection requires an optical element with high accuracy, stacking of glass or molding by nanoimprinting is used. When the optical element is made of resin in order to reduce the cost, it becomes difficult to mold the optical element with high accuracy, and as the size of the optical element increases, it becomes more difficult to mold the optical element. For this reason, the maximum size of a retroreflective element is, at present, about 30 cm.

On the other hand, in order to solve such a problem, there has been attempts to mold the retroreflective element or the aerial image element with a flexible material and produce the same in a roll shape, but since the shape of the optical element is also easily deformed due to its flexibility, there is a trade-off between a high-quality aerial image and an increase in size of the optical element, such as degradation of image quality.

An object of the present disclosure is to solve such conventional problems, and thus provide a method for manufacturing an optical element with high accuracy and that can be increased in size, an aerial image display device, and a spatial input device.

A method for manufacturing an optical element according to the present disclosure includes a step of forming an optical element unit formed by an optical material and having an outer shape of a regular triangle or a regular hexagon as a minimum structure, a step of two-dimensionally arranging a plurality of optical element units on a substrate, and a step of processing the substrate on which the plurality of optical element units are mounted into a desired surface shape.

In an aspect, the plurality of optical element units may be arranged on the substrate so as to imitate a molecular structure of graphene or a carbon nanotube. In the aspect, each of the optical element units may be formed by molding a glass material or a resin material using a mold or a cast. In the aspect, the desired surface shape may be a curved surface. In the aspect, the optical element units may be retroreflective elements. In the aspect, the optical element units may be micromirrors. In the aspect, the optical element units may be microlenses.

An aerial image display device according to the present disclosure includes a retroreflective member manufactured by the manufacturing method described above, a light source, and a beam splitter that reflects light from the light source toward the retroreflective member and transmits the light reflected by the retroreflective member.

A spatial input device according to the present disclosure includes the above-described aerial image display device, and a detection unit that detects an approach of an object toward an aerial image displayed by the aerial image display device.

According to the present disclosure, an optical element is manufactured by arranging optical element units having an outer shape of a regular triangle or a regular hexagon as a minimum structure, and thus it is possible to provide an optical element which has high accuracy and that can be increased in size.

DETAILED DESCRIPTION

Next, embodiments of the present disclosure will be described. A method for manufacturing an optical element according to the present disclosure provides an optical element which is enlarged by molding glass or resin, which is a material of the optical element, into a small size by pressing or molding, and arranging the glass or resin on a flat surface or a curved surface, thereby solving the aforementioned trade-off between high quality and enlargement. Thus, an affordable optical element that can be mass-produced while maintaining high quality is achieved. The optical element manufactured by the present disclosure can be applied to an aerial display or the like that displays an aerial image. In addition, such an aerial display can be applied to a spatial input device that enables user input using an image displayed in the air.

The drawings to be referred to in the description of the following embodiment include exaggerated displays in order to facilitate understanding of the disclosure, and do not directly represent the shape and scale of an actual product.

Embodiments

Figure 1:
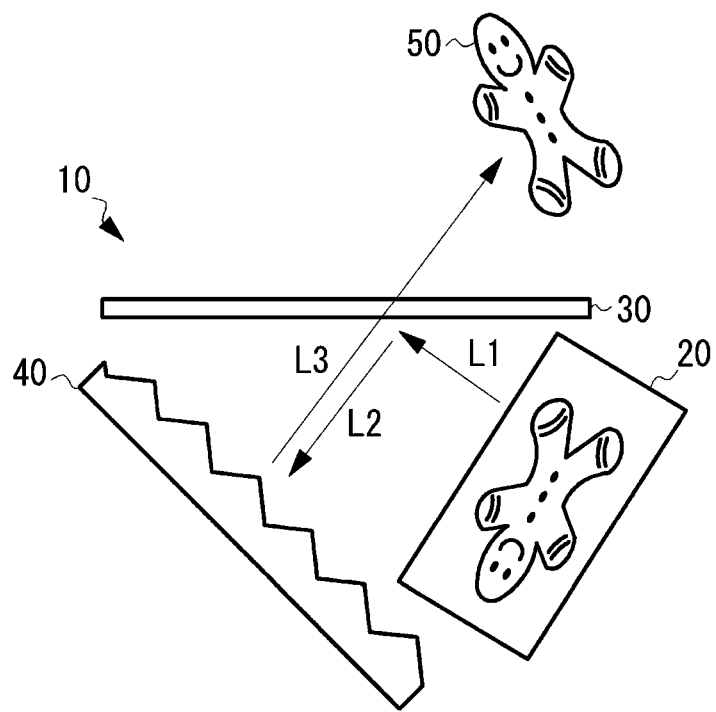
FIG. 1 is a cross-sectional view illustrating a schematic configuration of a conventional retroreflective display device.
Figure 2:
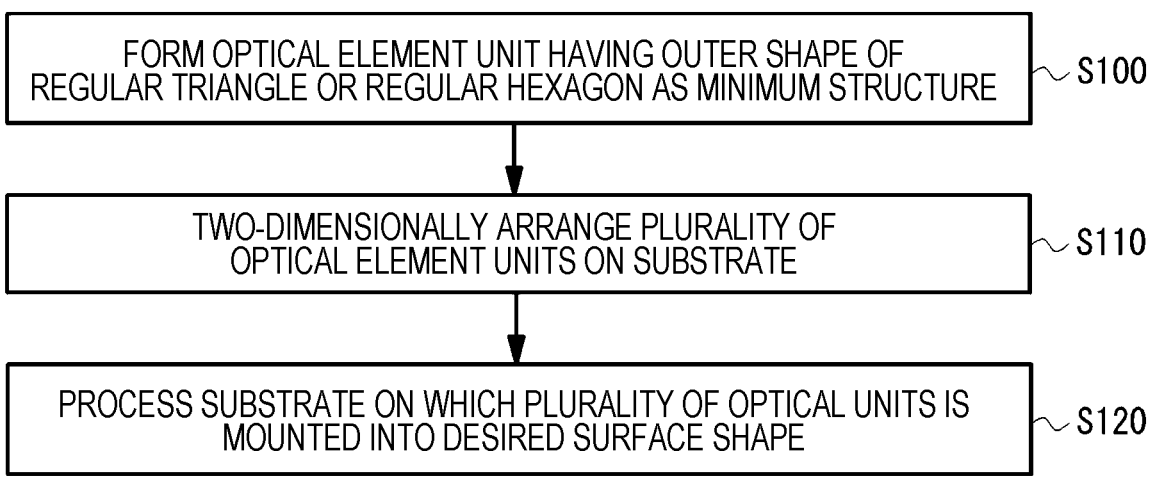
FIG. 2 is a flow chart illustrating a method for manufacturing an optical element according to an embodiment of the present disclosure.

FIG. 2 is a flow chart for describing the method for manufacturing the optical element according to the embodiment of the present disclosure. The method for manufacturing an optical element according to the present embodiment includes a step (S100) of forming an optical element unit having an outer shape of a regular triangle or a regular hexagon as a minimum structure for constituting an optical element, a step (S110) of two-dimensionally arranging a plurality of optical element units on a substrate, and a step (S120) of processing the substrate on which the plurality of optical element units are mounted into a desired surface shape.

A planar shape of the optical element unit is formed into a regular triangle or a regular hexagon as a minimum structure. When the plurality of optical element units are arranged to form an arbitrary size and an arbitrary surface shape, the planar shape of the optical element unit is required to be geometrically a regular triangle, a quadrangle, or a regular hexagon. In order to form a curved surface, a spherical surface, or an arbitrary surface shape by the optical element units, a regular triangle or a regular hexagon is more advantageous than a quadrangle.

The optical element unit is formed by, for example, a glass press or a glass mold. Specifically, glass softened to a high temperature is poured into a regular triangular or regular hexagonal mold or cast, and pressure is applied to mold a regular triangular or regular hexagonal optical element unit. In the press molding, if the mold or the cast is too large, the pressure may not be uniformly applied to the glass material, and shrinkage, a cavity, or the like occur, such that the accuracy of the molded optical element unit may be deteriorated. Therefore, in order to mold a highly accurate optical element unit, it is necessary to limit the mold or the cast to a certain size. Furthermore, in order to form a curved surface or the like from the arrangement of the plurality of optical element units, a smoother curved surface can be obtained as the size of the optical element unit is smaller. For example, the optical element unit is molded to a size of about 1 cm. Such a glass press or glass mold produces a large amount of highly accurate optical element units.

Note that the optical element unit may be made of resin in addition to glass, and in this case, the resin material is poured into a mold and pressed or molded. The material of the resin may comprise, for example, polycarbonate or cycloolefin-based resin.

Figure 3:
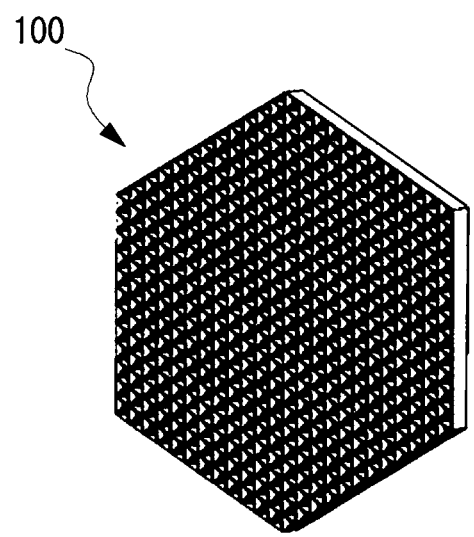
FIG. 3 is a diagram illustrating a glass retroreflective component molded into a regular hexagon by the manufacturing method according to the present embodiment.

The optical characteristics of the optical element unit are configured to match the optical characteristics of a target optical element. For example, in a case where a retroreflective element is configured by the plurality of optical element units, a retroreflective structure is formed on the surfaces of the optical element units. The retroreflective structure is, for example, dihedral corner reflector array (DCRA), triangular pyramid reflection, or the like. FIG. 3 illustrates a glass retroreflective component molded into a regular hexagon. In addition, in a case where the plurality of optical element units constitutes a microlens, the optical element units are configured to include a concave lens, a convex lens, and the like, and in a case where the plurality of optical element units constitute a micromirror, the optical element units are configured to include a reflection layer.

A side surface of the optical element unit does not necessarily need to be perpendicular to a bottom surface, and may be inclined so that side surfaces do not interfere with each other between adjacent optical element units when the plurality of optical element units are laid. Alternatively, an engaging portion such as a concave portion or a convex portion may be formed on a side surface of the optical element unit so that adjacent optical element units can be physically coupled to each other. In addition, the bottom surface of the optical element unit may be flat so that an adhesive or the like can be applied when the optical element unit is mounted on the substrate, or alternatively, a concave portion or a convex portion on the bottom surface of the optical element may be engaged with a corresponding surface formed on the substrate.

Figure 4:
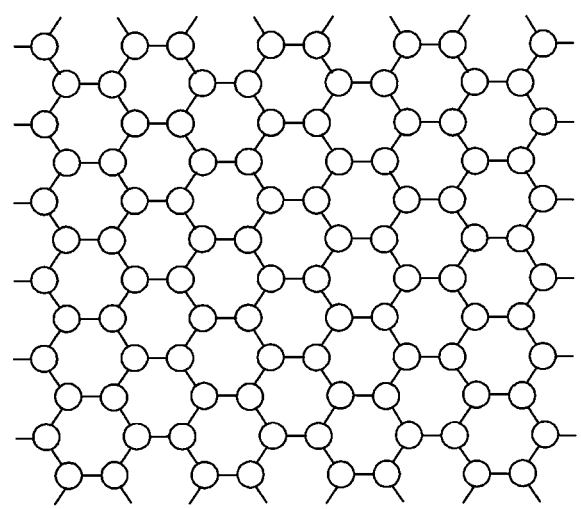
FIG. 4 is a diagram illustrating a molecular model of graphene.

Next, the plurality of optical element units are two-dimensionally laid on the substrate like tiles. The size of the substrate is appropriately selected according to the size of the intended optical element. When the plurality of optical element units are spread on the substrate, the plurality of optical element units are regularly arranged so as to imitate the molecular structure of graphene, a carbon nanotube, or fullerene (C60). FIG. 4 is a molecular model of hexagonal graphene.

For example, the bottom surfaces of the plurality of optical element units are fixed onto the substrate with an adhesive. The optical element units may be arranged so that a certain gap is formed between adjacent optical element units, or may be arranged so that side surfaces of adjacent optical element units are in contact with each other.

Figure 5A:
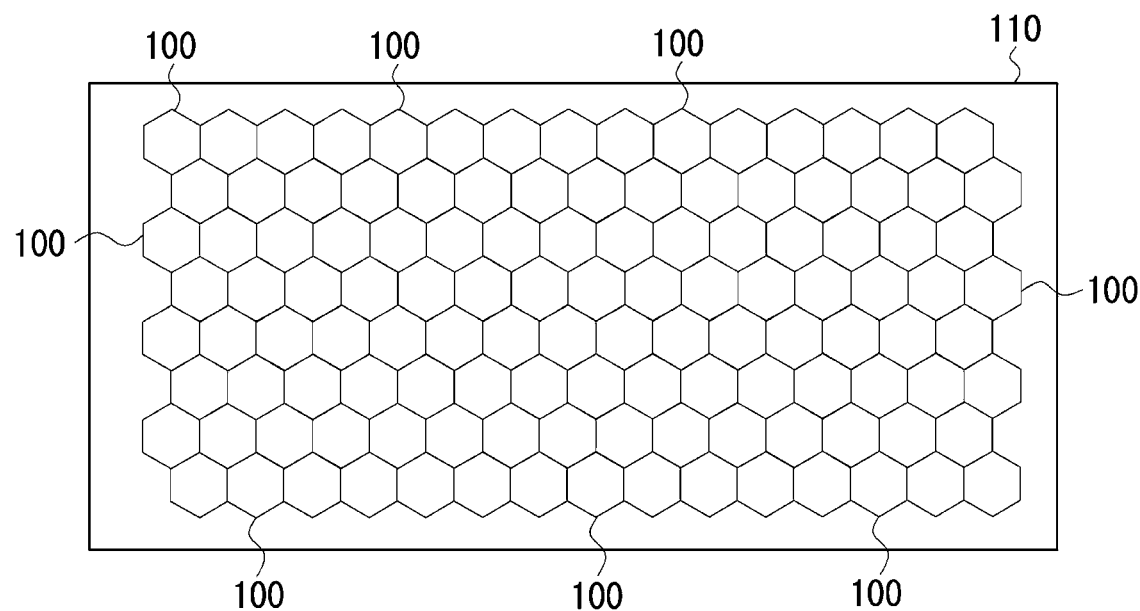
FIG. 5A is a plan view illustrating an example in which a plurality of optical element units are arranged on a rectangular substrate.
Figure 5B:
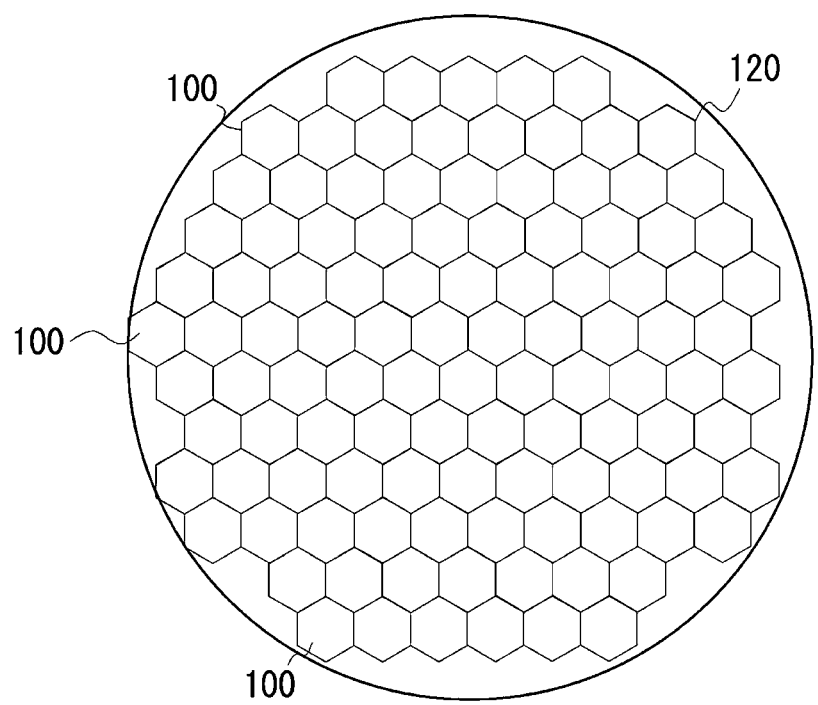
FIG. 5B is a plan view illustrating an example in which a plurality of optical element units are arranged on a circular substrate.

FIG. 5A is a plan view illustrating a state in which a plurality of optical element units 100 are arranged on a rectangular substrate 110 so as to imitate the molecular structure of graphene, and FIG. 5B is a plan view illustrating a state in which a plurality of optical element units 100 are arranged on a circular substrate 120 so as to imitate the molecular structure of graphene. The shape, thickness, and material of the substrates 110 and 120 are not particularly limited, but the substrates 110 and 120 are desirably made of a material having flexibility so as to be processed into a desired surface shape. In addition, it is desirable that the substrates 110 and 120 have strength capable of holding a surface shape after being processed.

Here, an example in which regular hexagonal optical element units are arranged has been described, but also in a case where regular triangular optical element units are used, these optical element units are arranged so as to imitate the molecular structure of graphene or a carbon nanotube. Furthermore, it is also possible to arrange both the regular triangular optical element unit and the regular hexagonal optical element unit on the substrate.

Next, the substrate on which the plurality of optical element units are mounted is processed so as to have a desired surface shape. The desired surface shape can be, for example, a curved surface, a spherical surface, a stepped surface, or the like, and this surface shape matches the shape of the intended optical element. When the substrate is processed into a desired surface shape, the optical element units themselves mounted on the substrate are not deformed, and the boundary between the optical element units is displaced, so that a desired surface shape is provided.

Figure 6A:
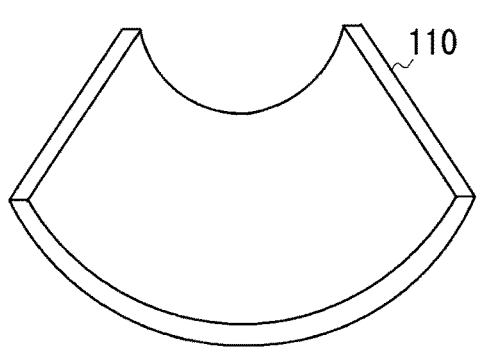
FIGS. 6A and 6B are diagrams illustrating an example in which a substrate on which a plurality of optical element units are arranged is processed into a curved surface shape.
Figure 6B:
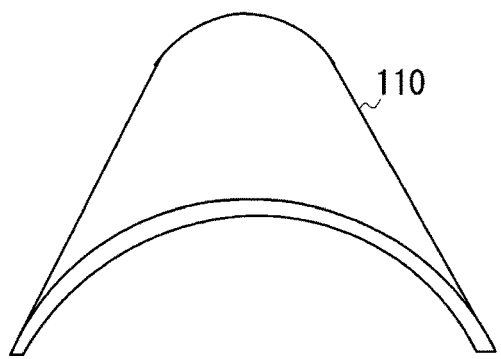

FIG. 6A illustrates an example in which the substrate 110 of FIG. 5A is processed to provide a concave curved surface. That is, a concave curved surface is formed by the plurality of optical element units on the substrate 110. FIG. 6B illustrates an example in which the substrate 110 of FIG. 5A is processed so as to provide a convex curved surface. That is, a convex curved surface is formed by the plurality of optical element units on the substrate 110. Of course, the substrate 110 can be processed into an arbitrary surface shape other than those illustrated in FIGS. 6A and 6B.

Figure 7:
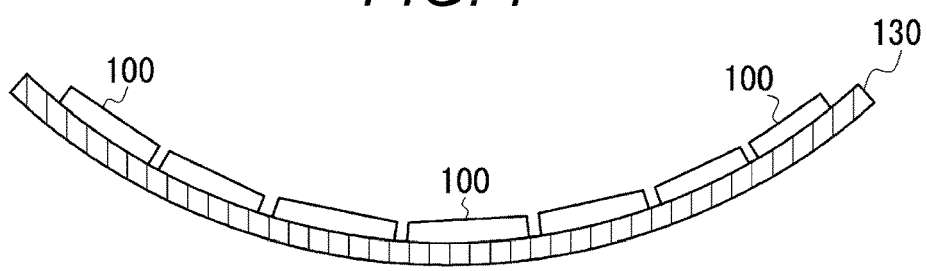
FIG. 7 is a diagram illustrating a method for manufacturing an optical element according to another embodiment of the present disclosure.

In the above manufacturing method, an example in which a plurality of optical element units are arranged on a flat substrate and then the substrate is processed into a desired surface shape has been described, but the manufacturing method of the present disclosure is not necessarily limited thereto. In a manufacturing method according to another embodiment of the present disclosure, a substrate processed to have a desired surface shape may be prepared, and a plurality of optical element units may be arranged on the substrate. FIG. 7 illustrates a cross-sectional structure of a substrate 130 processed into a concave curved surface, and a plurality of optical element units 100 may be arranged on such a concave curved surface of the substrate 130 so as to imitate the molecular structure of graphene or a carbon nanotube.

In a case where an optical element is formed by molding glass or resin with high accuracy, such an optical element cannot usually be curved, but as in the present embodiment, by molding an optical element unit having a regular triangle or a regular hexagon with high accuracy, and arranging such optical element units on a substrate, an optical element having an arbitrary surface shape can be easily formed, and an increase in size of the optical element can be easily achieved.

Figure 8:
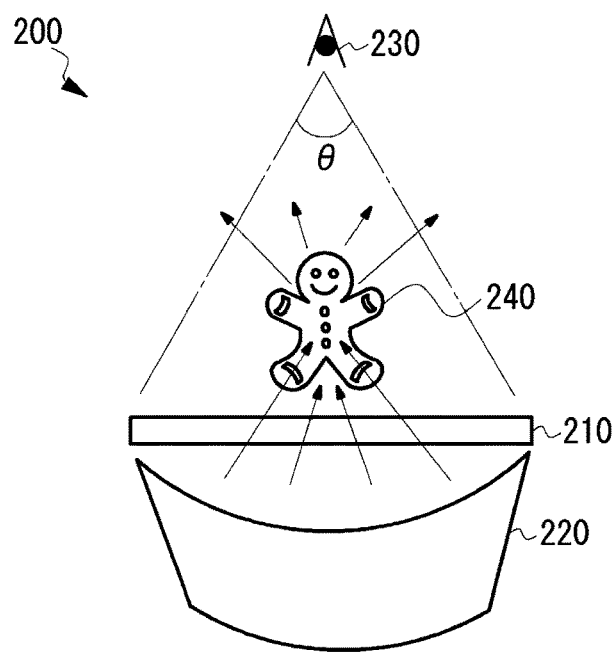
FIG. 8 is a diagram illustrating a configuration of an aerial image display device using a retroreflective member manufactured according to an embodiment of the present disclosure.

FIG. 8 illustrates an aerial image display device having a retroreflective member manufactured by the manufacturing method of the present embodiment. In an aerial image display device 200, light from a light source (for example, an image output device that outputs an image) not illustrated is reflected by a beam splitter 210, the reflected light travels to the retroreflective member 220, the light reflected by the retroreflective member 220 passes through the beam splitter 210, and an aerial image 240 is generated in a space in front of the observer's eyes 230.

The aerial image 240 that can be observed by the observer is limited to a range in which the observer can see the retroreflective member 220, but a viewing angle θ of the aerial image 240 is secured by making the retroreflective member 220 a curved surface (i.e., the viewing angle is widened, and the aerial image can be viewed from a wide angle). In addition, by using the highly accurate retroreflective member 220 formed by molding glass or resin, the high-quality aerial image 240 and the highly reliable optical element can be achieved. Furthermore, for example, in a case of glass lamination, the cost of making one plate is very high, but in a case of the glass press or mold, mass production is possible, a significant cost reduction is possible, and therefore, the cost of the optical element of the aerial image can be reduced.

Although not illustrated here, the present disclosure can also be applied to the aerial image display device that displays an aerial image using a micromirror or a microlens manufactured by the manufacturing method of the present disclosure.

Figure 9:
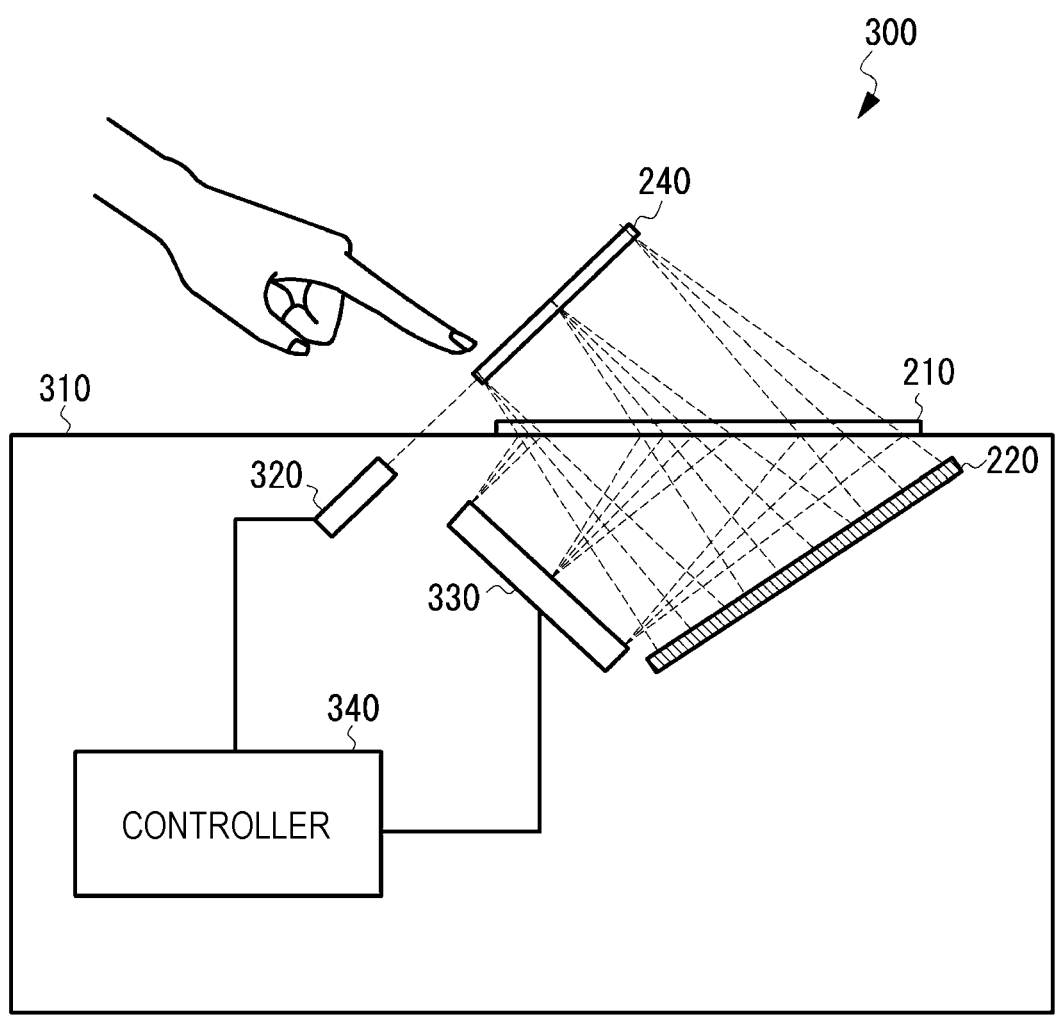
FIG. 9 is a diagram illustrating a configuration of a spatial input device using the retroreflective member manufactured according to the embodiment of the present disclosure.

FIG. 9 is a diagram illustrating a schematic configuration of a spatial input device to which the aerial image display device of the present embodiment is applied. The spatial input device 300 includes a housing 310 that accommodates the aerial image display device 200 as illustrated in FIG. 8, a three-dimensional distance sensor 320 that detects an approach of an object (for example, a user's finger or the like) toward the aerial image 240, and a controller 340 that controls image output and the like of the light source 330 on the basis of a detection result from the three-dimensional distance sensor 320.

When the user looks at the aerial image 240 floating in front of the user and holds his or her finger over the display position to instruct a desired input, the three-dimensional distance sensor 320 detects the three-dimensional distance of the finger and outputs the three-dimensional distance to the controller 340. The controller 340 calculates the position of the user's finger on the basis of the detection result of the three-dimensional distance sensor 320, determines that the user has operated an input related to the aerial image 240, and controls the light source 330 on the basis of the determination result to output another image or outputs the determination result to an external electronic device (which is not illustrated).

The preferred embodiments of the present disclosure have been described in detail above. However, the present disclosure is not limited to the specific embodiments, and thus various modifications and alterations can be made within the scope of the the claims. Therefore, it is intended that this disclosure not be limited to the particular embodiments disclosed, but that the disclosure will include all embodiments and implementations falling within the scope of the appended claims.

What is claimed is:

1. A method for manufacturing an optical element configured for use in an aerial image display device, the method comprising:

forming an optical element unit comprised of an optical material and having an outer shape of a regular triangle or a regular hexagon;

arranging a plurality of optical element units two-dimensionally on a substrate; and, processing the substrate on which the plurality of optical element units are mounted into a desired non-planar surface shape such that the optical elements units are not deformed, and a boundary between the optical element units is displaced, so that the desired surface shape is provided.

2. The manufacturing method according to claim 1, wherein the plurality of optical element units are arranged on the substrate so as to imitate a molecular structure of graphene or a carbon nanotube.

3. The manufacturing method according to claim 1, wherein each of the optical element units is formed by molding a glass material or a resin material using a mold or a cast.

4. The manufacturing method according to claim 1, wherein the desired surface shape is a curved surface.

5. The manufacturing method according to claim 4, wherein the optical element units are retroreflective elements.

6. The manufacturing method according to claim 4, wherein the optical element units are micromirrors.

7. The manufacturing method according to claim 4, wherein the optical element units are microlenses.

8. An optical element manufactured by the method according to claim 1.

9. An aerial image display device, comprising:
a retroreflective member manufactured by the method according to claim 1;
a light source; and,
a beam splitter that reflects light from the light source toward the retroreflective member and transmits the light reflected by the retroreflective member.

10. A spatial input device, comprising:
an aerial image display device according to claim 9; and,
a detection unit that detects an approach of an object toward an aerial image displayed by the aerial image display device.

* * * * *